Figure 1:
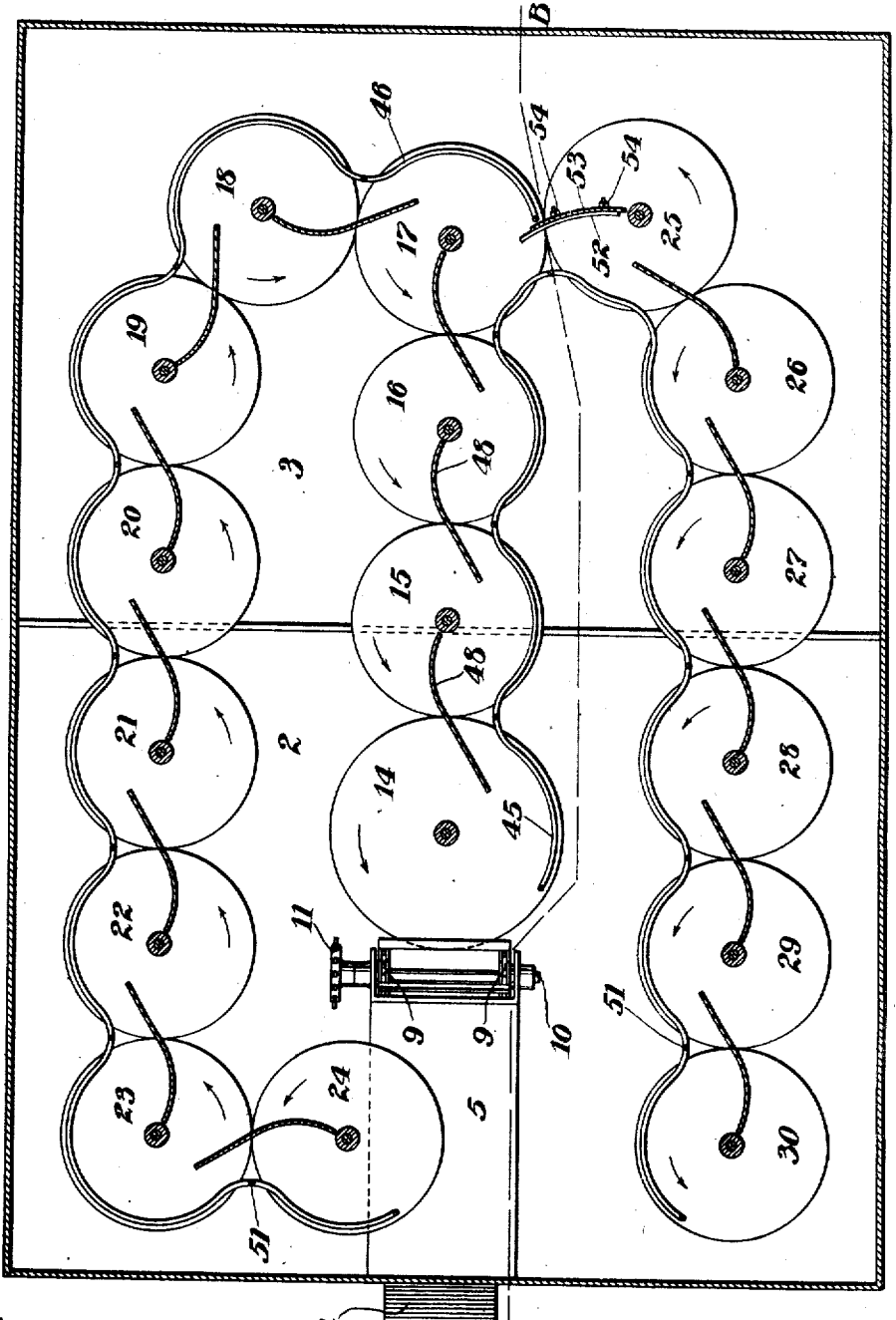

J. H. MICHENER, Jr.
DISTRIBUTING MECHANISM.
APPLICATION FILED NOV. 9, 1911.

1,139,133.

Patented May 11, 1915.
4 SHEETS—SHEET 1.

Witnesses:
Louis B. Fischler
Chas. W. La Rue

Inventor:
John H. Michener, Jr.
by Wilbur M. Stone
his Attorney.

J. H. MICHENER, Jr.
DISTRIBUTING MECHANISM.
APPLICATION FILED NOV. 9, 1911.
1,139,133.
Patented May 11, 1915.
4 SHEETS—SHEET 2.
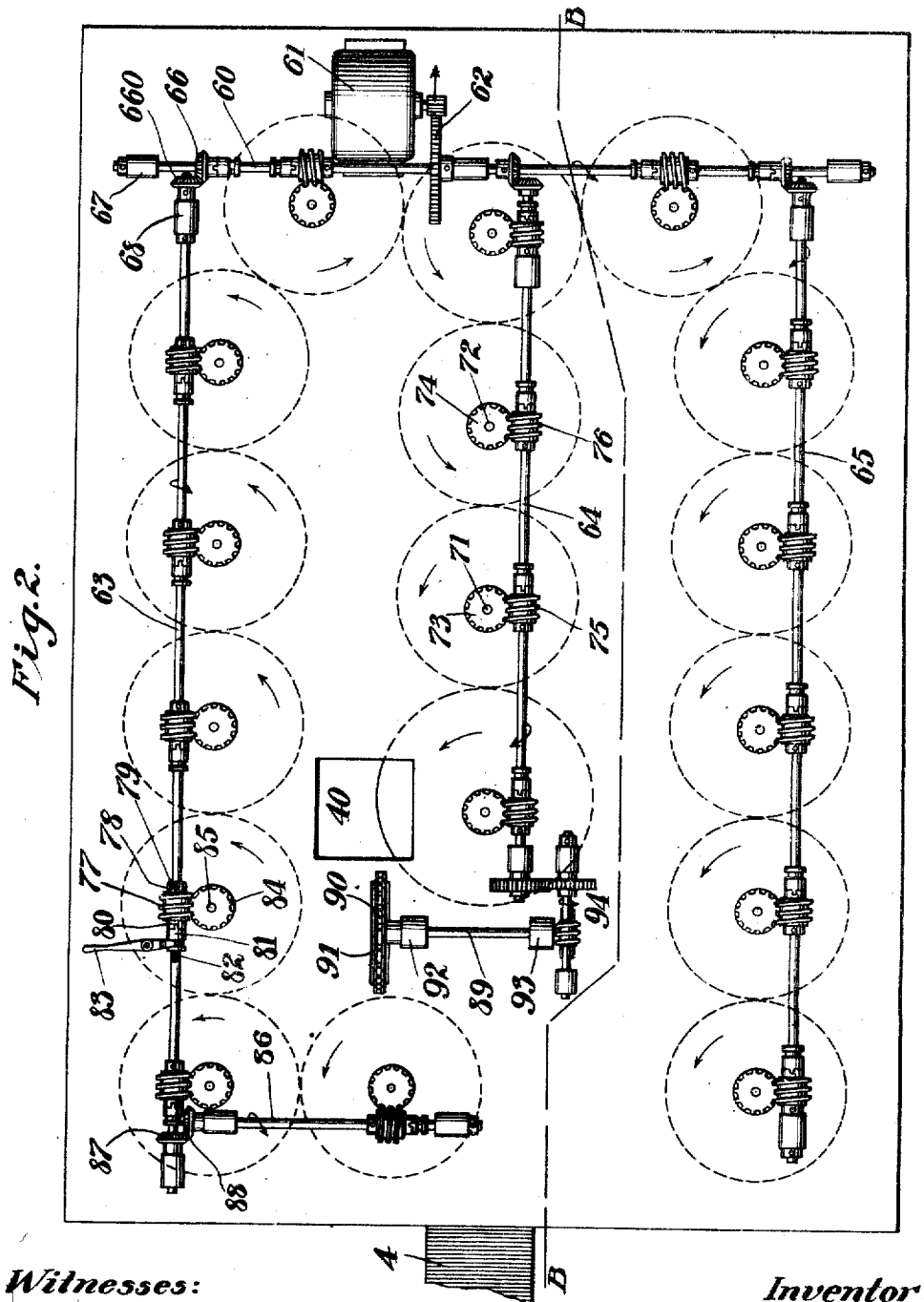
Witnesses:
Louis B. Fischler
Chas. W. La Rue
Inventor:
John H. Michener, Jr.
by Wilbur M. Stone
his Attorney.

J. H. MICHENER, Jr.
DISTRIBUTING MECHANISM.
APPLICATION FILED NOV. 9, 1911.
1,139,133.
Patented May 11, 1915.
4 SHEETS—SHEET 3.
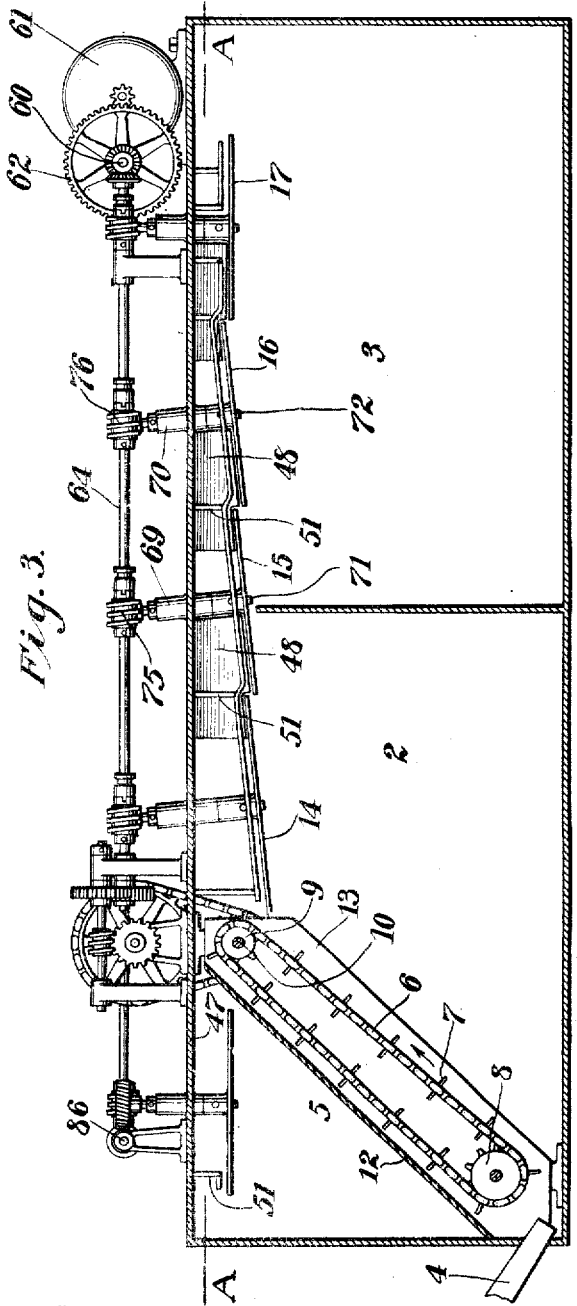
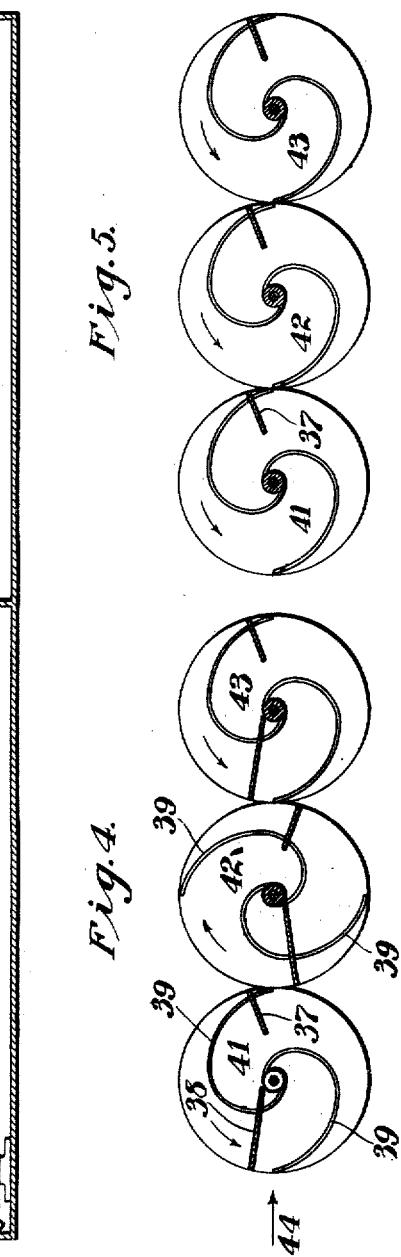
Witnesses:
Louis B. Fischler
Chas. W. La Rue
Inventor:
John H. Michener, Jr.
by Wilbur M. Stone
his Attorney.

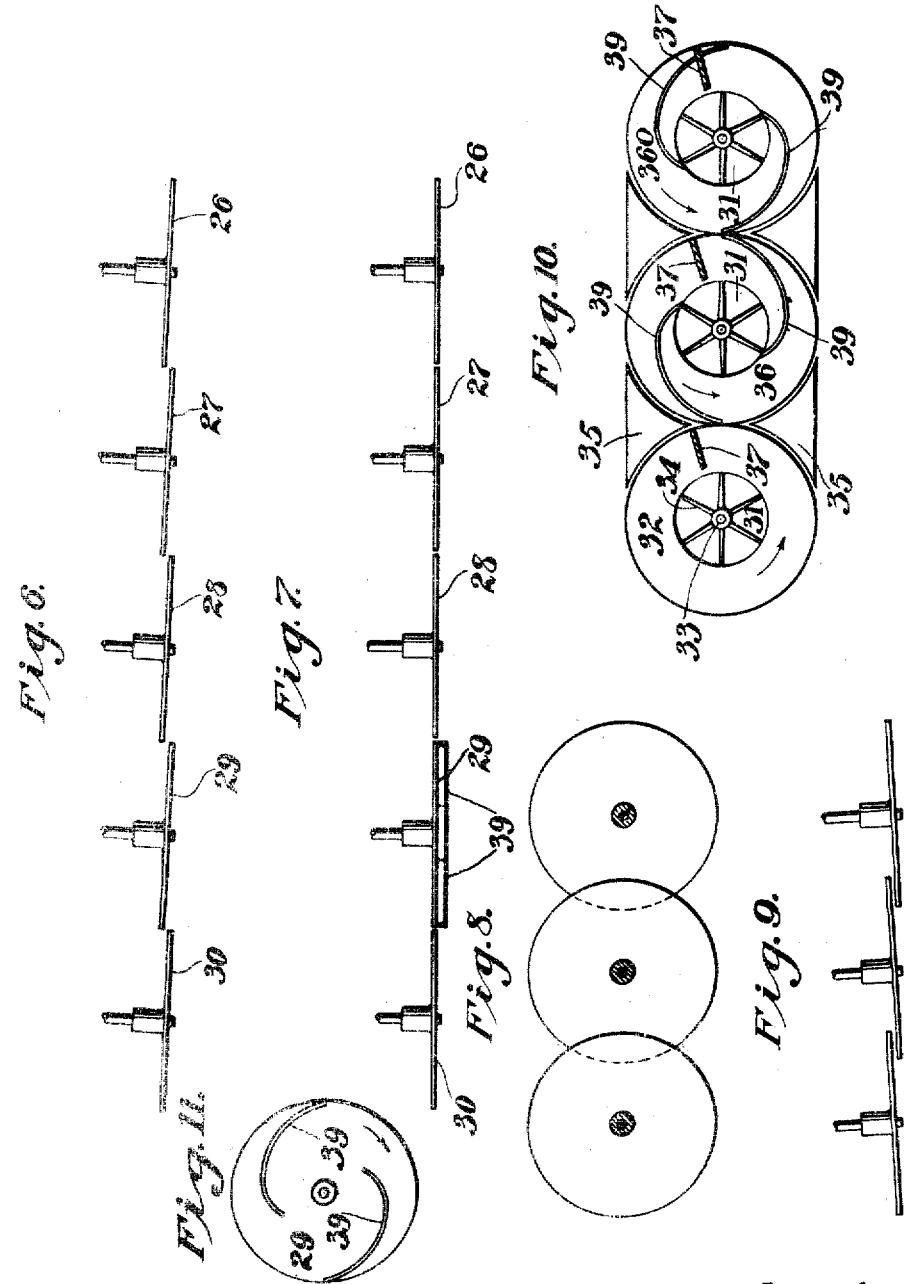

UNITED STATES PATENT OFFICE.

JOHN H. MICHENER, JR., OF NEW YORK, N. Y.

DISTRIBUTING MECHANISM.

1,139,133.      Specification of Letters Patent.      Patented May 11, 1915.

Application filed November 9, 1911. Serial No. 659,276.

*To all whom it may concern:*

Be it known that I, JOHN H. MICHENER, Jr., a citizen of the United States, and a resident of New York, in the county of New York and State of New York, have invented certain new and useful Improvements in Distributing Mechanism, of which the following is a specification.

This invention relates to distributing mechanism, and particularly to stowage devices comprising trimming conveyers.

This improvement is especially adapted for permanent installation, for instance in the coal bunkers of a ship.

The object of this invention is to provide means of simple construction, having small liability to clogging or derangement in operation and requiring a small amount of driving power relatively to the work performed.

Figure 1 is a plan view taken on a plane indicated by the line A—A of Fig. 3. Fig. 2 is a plan view. Fig. 3 is a sectional elevation taken on line B—B of Figs. 1 and 2. Figs. 4 and 5 are detail plan views illustrating spiral ribs on the disks. Fig. 6 is an elevation showing one manner of disposing the disks. Fig. 7 is an elevation of a different relative arrangement of the disks, and also of an additional trimming feature. Figs. 8 and 9 are a plan and elevation respectively showing another manner of disposing the disks. Fig. 10 is a plan view of three distributing disks and associated parts; and Fig. 11 is an underside plan view of the trimming feature illustrated in elevation in Fig. 7.

My improved mechanism includes as its first feature a series of consecutive disks mounted for rotation in the same general plane, said plane being usually horizontal. In practice I may incline the disks so that their axes are parallel and disposed at a slight angle to the normal of their general plane. By this arrangement the delivery side of any given disk is elevated slightly above the receiving side of its succeeding disk thus facilitating the flow of material from one to the other.

I have illustrated my improved device installed in a pair of rectangular bunkers 2, 3 the coal or other bulk material to be conveyed stowed and trimmed being received through chute 4 into one side near the bottom of bunker 2. Extending upwardly from said receiving point is elevator 5 which will be of some convenient character such as inclined endless chains as 6 having blades or buckets 7. If it is convenient to deliver the coal through a deck hatch as 40, it will be obvious that an elevator need not be employed. Said elevator is preferably inclosed by a three-sided trunk comprising top 12 and sides as 13 but having an open bottom. The elevator thus constructed acts by scraping the received coal upwardly and inwardly toward the middle of the bunker and as the coal accumulates the top of the pile will reach the first disk 14 and coal will be delivered onto the face of said disk. The disk 14 is, in the illustration, the first or terminal disk of a series embodying a plurality of disks. Chains as 6 may be conveniently mounted on sprockets as 8 at the bottom, and 9, 9 at the top. Said upper sprockets may be fixed to shaft 10 having sprocket 11 fixed to its outboard end for driving purposes as hereinafter described. Disks 14, 15 and 16 or the middle row, or receiving series are preferably stepped relatively to each other, disk 14 being the lowest and if desired the largest for conveniently receiving material, and disk 16 being the highest for the purpose of conveniently delivering onto disk 17. The disk at the far end of the bunker, in the illustration disk 17, is preferably horizontally disposed and located quite near the roof of the bunker. At one side of disk 17 is mounted disk 18, the first of a series of disks extending along one side of bunkers 2 and 3 and including disks 19 to 23 inclusive and ending with disk 24 extending partially over the trunk of elevator 5. At the other side of disk 17 is mounted disk 25 the first of a series of disks extending along the other side of said bunkers and including disks 26 to 30 inclusive.

In the diagrammatic elevation of Fig. 6 disks 26 to 30 inclusive are shown arranged in the same general plane but inclined to one another so that the delivery side of each disk is slightly above the receiving side of its adjacent disk. In Fig. 7 the disks are shown lying in one common plane. Figs. 8 and 9 illustrate an arrangement similar to that of Fig. 6 but showing each disk more or less overlapping its adjacent disk. In Fig. 10 the disks are provided with a central opening 31 through each thereof, the annular body 32 being supported from the central hub 33 by arms as 34. These central openings are particularly useful where my improvements are used for trimming coal or other material when from the conditions or nature of the material there is a tendency to leave portions of the bunker under said disks unfilled.

Each of the disks illustrated in Fig. 10 is provided with a conveying portion, the annulus 32, and inwardly thereof with an opening. The material being conveyed will be directed in part toward the openings and will accumulate beneath the disks. When material accumulates beneath any disk in excess of that required to fill at that place, the excess material will not pass down through the opening, but will be forwarded over the annulus and to another disk or moved laterally. In said Fig. 10 I have also illustrated a plurality of transfer tables 35, 35 which I may employ for assisting material from disk to disk. It will be obvious that said transfer tables are applicable to any of the various arrangements of disks which I have illustrated. Said transfer tables are approximately triangular, each having two inwardly curved sides concentric with the peripheries of the adjacent disks between which said table lies and having a third side approximately in the line of common tangency of said disks. In Figs. 4 and 5 I have illustrated the disks of my improved device with spiral members, comprising either ribs or grooves 39, on the face sides thereof for assisting the discharge of material from said disks as that material encounters deflectors as 37, 38 over disk 41, Fig. 4. Said spiral members are equally applicable to disks having a central opening, as disks 36 and 360, Fig. 10. I have also found said members 39, 39 efficient when employed as ribs on the bottom of disks, see disk 29, Fig. 7 and the bottom plan view thereof in Fig. 11, for urging the coal piled under the disk, toward the center thereof.

The movement of the material centripetally of the disks and into position beneath the disks assures a complete filling of the bunkers beneath the conveyer. The devices illustrated in Figs. 7 and 11 and Fig. 10 are useful for trimming the discharged material beneath the units of the conveyer. On disk 36 spiral members 39 are arranged to assist material toward central opening 31; on disk 360 spiral members 39 are arranged to assist material toward the periphery of said disk, in coaction in each case, with deflectors, as 37, said disks being rotated in the direction of their respective arrows.

In Fig. 4 disks 41 and 43 are arranged for rotation in anti-clockwise direction and disk 42 in clockwise direction: therefore if said series of disks is operated for advancing material in the general direction of arrow 44, spiral members 39, 39 of disk 42 will occupy positions on said disk the reverse of the positions of spiral members 39, 39 on disks 41, 43 all respectively.

In Fig. 5, as all the disks are arranged to rotate in anti-clockwise direction the positions of spiral members 39, 39 will be the same relatively to their respective disks.

In Fig. 1 I have illustrated several means for directing the flow of material over the disks, comprising guide rails and deflectors. Said guide rails as 45 extend over one or more of said disks adjacent to the upper face or faces thereof and near one side for retaining the material on said disks. As illustrated said rail 45 extends lengthwise along one edge of disks 14, 15, 16 and 17 and then is bent backwardly, following along one edge of disks 25 to 30 inclusive. A similar rail 46 extends along the outside edges of disks 17 to 24 inclusive. These rails will be supported in some convenient way by posts 51 from deck 47 above the bunker. Said rails are narrow relatively to the width of the deflectors. This is for causing the conveyed material to partly spill off in transit. These rails may, in some installations, be dispensed with. Deflectors, illustrated in one embodiment at 48, 48 over disks 14, 15, 16 of Fig. 1 and in other embodiments at 37, 38 as over disk 41 of Fig. 4 are efficient for deflecting the material carried by the disks off of said disks.

Deflector 48 (Fig. 1) extends from near the axis on the receiving side of disk 15 to over the delivery portion of adjacent disk 14, while deflectors 37, 38 (Fig. 4) are located over the delivery portions of disk 41. Said deflector 37 is short extending from the periphery of disk 41 inwardly about half way to the axis of said disk, whereby material on the outer portion of said disk will be deflected thereby; while deflector 38 extending from the hub of said disk outwardly to the periphery will deflect that material near the middle of said disk left untouched by deflector 37. Said deflectors are preferably of greater height than rails 45, 46 and may depend from deck 47 as at 48 (Fig. 3). Another arrangement of said deflectors is illustrated in Fig. 1 where deflector 52 is mounted for adjustment radially of disks 17 and 25, whereby any desired portion of the load delivered to disk 17 may be deflected to disk 25 and the residue allowed to pass elsewhere. The adjusting means comprises fixed support 53 and bolts 54.

While I do not limit myself to any particular means for driving my improved apparatus I prefer to employ the means, illustrated, as to the general character, in Figs. 2 and 3. Therein power is supplied to fore and aft shaft 60 from electric motor 61 or from some other convenient source of power through gear 62 fixed on said shaft. From shaft 60 power is communicated to transverse shafts 63, 64 and 65 by the usual bevel gears as 66, 660. Shafts 60, 63, 64 and 65 are mounted in one plane and supported for rotation in bearings as 67, 68 on deck 47. The several disks as 15, 16 to be rotated are supported in bearings as 69, 70 respectively in deck 47. Disk shafts as 71, 72 have fixed to their upper ends worm gears as 73, 74 respectively and which gears are driven by worms as 75, 76 respectively loosely mounted on one of said shafts as 64. Each of said worms as 77 on shaft 63 has its end thrust taken by a collar as 78 fixed to its respective shaft by a pin as 79. One end of worm 77 has clutch member 80 for engagement with clutch sleeve 81 slidably mounted on shaft 63 and prevented from turning thereon by feather or tongue 82. Said sleeve 81 may be moved endwise upon said shaft and into and out of engagement with clutch member 80 by means of pivoted lever 83, for transmitting rotary movement from shaft 63 to gear 84, shaft 85 and disk 22 fixed thereto. Disk 24 receives power from shaft 63 through short shaft 86 driven through bevel gears 87, 88.

It will thus be seen that all the disks of my improved device may be operated at one time or any one thereof may be disengaged and stopped or any desired combination of disks may be operated while the other disks are at rest.

For driving elevator 5 I preferably employ a shaft 89 having sprocket 90 fixed thereto and chain 91 connecting said sprocket and sprocket 11 on elevator upper shaft 10. Shaft 89 is supported in bearings 92, 93 fixed to deck 47 and may receive its power from shaft 64 through train of gearing 94 of well known character.

The mode of operation of my improved mechanism will be obvious from the preceding description of its character but the following brief description of the early steps in the operation is given: The coal being delivered by chute 4 to the foot of elevator 5, blades 7 scrape the accumulating pipe inwardly and upwardly until the top of said pile is delivered onto the edge of first disk 14. The material as it forms in piles of sufficient height will be taken up by an adjacent disk. This may be done by the first or any other disk of the series. The material being stowed will be taken up and conveyed a longer or shorter distance as conditions control and discharged at the terminus or at intermediate points. Said disk, rotating in the direction of its arrow delivers the coal against the near side (Fig. 1) of first deflector 48 and thus onto disk 15 and then against second deflector 48 and onto disk 16 and so on to succeeding disks. Any surplus coal passing to the rear or far side of a deflector as second deflector 48 over disks 15, 16, will be carried around by disk 16 and scraped off by the rear face of first deflector 48. Rail 45 is efficient to assist the transit of the coal from disk to disk in its onward movement. When reaching adjustable deflector 52 the stream of coal may be divided by said deflector, part going onto disk 25 and part continuing onward on disk 17 for delivery to disk 18 and so on.

I claim:—

1. In a stowing or trimming device the combination with a series of rotary disks, a fixed rail associated therewith for forwarding material from end to end of the series, said device being provided with deflectors for immediately spilling the material.

2. A conveyer including in combination, a series of consecutive disks mounted for rotation in the same general plane and a fixed rail extending lengthwise of said series adjacent to the upper faces of said disks for retaining the material thereon.

3. A conveyer including in combination, a series of consecutive disks mounted for rotation in the same general plane, said disks having their receiving edge portions lower than their discharge edge portions and a fixed rail extending lengthwise of said series adjacent to the upper faces of said disks for retaining the material thereon.

4. A conveyer including in combination, a series of consecutively contiguous disks mounted for rotation in the same general plane, each of said disks having its receiving edge portion lower than the discharge edge portion of the disk from which it receives and a fixed rail extending lengthwise of said series adjacent the upper faces of said disks for retaining the material thereon.

5. In a conveyer the combination with a series of rotary disks, of a series of deflectors for causing the conveyed material to pass from disk to disk and a guide lower than the deflectors for partially retaining the conveyed material on the disks.

6. A conveyer including in combination, a series of consecutive disks mounted for rotation in the same general plane, a low rail extending lengthwise of said series adjacent to the upper faces of said disks for partially retaining the material thereon, and one or more deflectors for intermediately spilling material from said disks.

7. A conveyer including in combination, a series of consecutively contiguous disks mounted for rotation in the same general plane, each of said disks having its receiving edge portion lower than the discharge edge portion of the disk from which it receives, and a rail extending lengthwise of said series adjacent to the upper faces of said disks for retaining the material thereon, said rail being low relatively to the load to be carried for spilling a portion of the conveyed material.

8. A conveyer including in combination, a rotatable disk, a deflector thereover and one or more members on said disk for assisting the movement of the material thereon when said material encounters said deflector.

9. In a stowing and trimming device, the combination with a conveyer comprising a series of rotary disks for passing material from one point to a distant point, means for discharging material in transit at intermediate points, and means for trimming the material centripetally of the disks.

10. A conveyer including in combination, a rotatable disk, a central opening through said disk, a deflector over the delivery portion of said disk and one or more spiral members on said disk for assisting the movement of the material thereon when said material encounters said deflector.

11. A conveyer including in combination a series of consecutive disks mounted for rotation in the same general plane and transfer tables between adjacent disks.

12. In a stowing and trimming device, the combination with a conveyer comprising a series of rotary disks for passing material from one point to a distant point and for discharging material in transit at intermediate points and spiral vanes associated with the disks for moving the material centripetally thereof.

13. In a stowing and trimming device, the combination with a conveyer comprising a series of rotary disks for passing material from one point to a distant point, means for discharging material in transit at intermediate points, and means for directing the material to the central openings of the disks.

14. In a stowing and trimming device the combination with a conveyer comprising a series of rotary disks and blades on said disks for trimming the top of the heap of material by filling under the disks.

15. The combination with a conveyer comprising a series of rotary disks, each of the disks being provided with a conveying portion and inwardly thereof with an opening, and means for directing the material toward such openings.

Signed at New York, N. Y., this 31st day of October, 1911, before two subscribing witnesses.

JOHN H. MICHENER, Jr.

Witnesses:
LILIAN J. HILLE,
HENRY A. WAGNER.

It is hereby certified that in Letters Patent No. 1,139,133, granted May 11, 1915, upon the application of John H. Michener, jr., of New York, N. Y., for an improvement in "Distributing Mechanism," errors appear in the printed specification requiring correction as follows: Page 3, line 82, for the word "immediately" read *intermediately;* same page, line 105, after the word "adjacent" insert the word *to;* and that the said Letters Patent should be read with these corrections therein that the same may conform to the record of the case in the Patent Office.

Signed and sealed this 25th day of May, A. D., 1915.

[SEAL.]

R. F. WHITEHEAD,
*Acting Commissioner of Patents.*